(12) United States Patent
Davis et al.

(10) Patent No.: US 12,492,932 B2
(45) Date of Patent: Dec. 9, 2025

(54) ON-BOARD VEHICLE SCALES
(71) Applicant: PEDDERS SHOCK ABSORBER SERVICE PTY LTD, Dandenong South (AU)
(72) Inventors: Robert Andrew Davis, Dandenong South (AU); Scott Bruce Fiske, Dandenong South (AU); David Andrew Schneiders, Dandenong South (AU)
(73) Assignee: PEDDERS SCHOCK ABSORBER SERVICE PTY LTD, Dandenong South (AU)
( * ) Notice: Subject to any disclaimer, the term of this patent is extended or adjusted under 35 U.S.C. 154(b) by 558 days.
(21) Appl. No.: 17/799,580
(22) PCT Filed: Feb. 11, 2021
(86) PCT No.: PCT/AU2021/000012
§ 371 (c)(1),
(2) Date: Aug. 12, 2022
(87) PCT Pub. No.: WO2021/159165
PCT Pub. Date: Aug. 19, 2021
(65) Prior Publication Data
US 2023/0063195 A1 Mar. 2, 2023
(30) Foreign Application Priority Data
Feb. 14, 2020 (AU) ............... 2020900423
(51) Int. Cl.
*G01G 19/12* (2006.01)
*B60K 35/10* (2024.01)
(Continued)
(52) U.S. Cl.
CPC ............ *G01G 19/12* (2013.01); *B60K 35/10* (2024.01); *B60K 35/22* (2024.01); *G01G 19/021* (2013.01);
(Continued)

(58) Field of Classification Search
CPC .... G01G 19/12; G01G 19/021; G01G 23/015; G01G 23/10; G01G 19/08; B60K 35/00;
(Continued)

(56) References Cited

U.S. PATENT DOCUMENTS 4,858,161 A * 8/1989 Baumann ............... G01G 23/01
702/101
5,099,221 A 3/1992 Sandkuhler
(Continued)

FOREIGN PATENT DOCUMENTS

CN 203981255 U 12/2014
DE 102005051964 A1 5/2007
(Continued)

OTHER PUBLICATIONS

European Patent Office Extended Search Report issued in European Patent Application No. 21752905.6, dated Feb. 1, 2024; 8 Pages.
(Continued)

*Primary Examiner* — Jacques M Saint Surin
(74) *Attorney, Agent, or Firm* — Harness, Dickey & Pierce PLC

(57) ABSTRACT

The present invention provides methods and systems for determining the weight of a vehicle. Exemplary methods include the steps of: determining with one or more on-board sensors, a sensor output voltage; providing the sensor output
(Continued)

voltage information to a processing unit to determine the weight of the vehicle; and displaying the weight of the vehicle on a visual display unit.

20 Claims, 8 Drawing Sheets

(51) Int. Cl.
  *B60K 35/22* (2024.01)
  *B60K 35/28* (2024.01)
  *G01G 19/02* (2006.01)
  *G01G 23/01* (2006.01)
(52) U.S. Cl.
  CPC ........ *G01G 23/015* (2013.01); *B60G 2204/11* (2013.01); *B60G 2400/60* (2013.01); *B60K 35/28* (2024.01); *B60K 2360/16* (2024.01)
(58) Field of Classification Search
  CPC ........ B60K 35/10; B60K 35/22; B60K 35/28; B60K 2360/16; B60G 2401/26; B60G 2600/0422; B60G 2400/60; B60G 2204/11
  USPC ............................................................ 177/1
  See application file for complete search history.

(56) References Cited

U.S. PATENT DOCUMENTS

| 5,410,109 | A  | * | 4/1995 | Tarter  | G01G 23/3728 177/136 |
| 5,780,782 | A  | * | 7/1998 | O'Dea   | G01G 19/08 177/136 |
| 7,952,489 | B1 | * | 5/2011 | Paterno | B60Q 1/5037 340/815.4 |

FOREIGN PATENT DOCUMENTS

| EP | 0371277 A3 | 8/1990 |
| EP | 0625697 A1 | 11/1994 |
| EP | 0968892 A1 | 1/2000 |
| GB | 2178546 A | 2/1987 |
| WO | WO-1995011813 A1 | 5/1995 |
| WO | WO-2007/095088 A2 | 8/2007 |
| WO | WO-2008/019105 A2 | 2/2008 |

OTHER PUBLICATIONS

Office Action from Chinese State Intellectual Property Office (machine translation) in corresponding CN application (dated Mar. 25, 2025), citing GB 2 178 546 A.

* cited by examiner

ON-BOARD VEHICLE SCALES

CROSS-REFERENCE TO RELATED APPLICATIONS

This application is a national phase entry of International Patent Application No. PCT/AU2021/000012, filed on Feb. 11, 2021, which claims priority to Australian Patent Application Serial No. 2020/900423, filed on Feb. 14, 2020, all of which are incorporated by reference herein.

FIELD

The present invention relates to methods and systems for supplying accurate vehicle weight information to a vehicle operator.

BACKGROUND

The weight of a vehicle is critical to its safe operation on the road. With the proliferation of light commercial vehicles being used in both the commercial and private sectors, and regulators (rightfully) providing increased scrutiny, the need for vehicle operators to be aware of the legal compliance of their vehicle in relation to weight has become paramount. The duty of care that now extends to fleet managers and owners through chain of responsibility legislation means that a solution, other than random infrequent compliance checks at sparsely positioned static weigh stations, is required.

The overloading of any vehicle provides a very real public safety risk. The braking distance of a vehicle increases dramatically with increases in weight and speed of vehicle. Mitigating that safety risk through a cost effective in-vehicle detection system may provide improved safety and regulatory compliance.

Whilst regulators currently utilise both static and transportable scales devices for compliance oversight, a vehicle's weight can change by over 20% of its stated legal gross vehicle mass (GVM) with just the addition of occupants. Accordingly, in-vehicle systems for measuring weight have been developed. Unfortunately, these systems typically have drawbacks and are unable to provide the reliable, real-time monitoring that is required. Previous iterations of on-board scales have employed various types of sensor and configurations for providing signal inputs such as load cells, strain gauges and air pressure sensors. Many of these types of apparatus send an electrical signal based on force, pressure or deflection calculated from a zero point. Due to dynamic suspension movement when cornering and braking, weight transfer can cause such systems to send false readings to the vehicle operator.

The present invention seeks to provide on-board vehicle scales that ameliorate at least one of the disadvantages of previous systems, or at least provide a useful alternative. The reference to any prior art in this specification is not, and should not be taken as, an acknowledgement or any form of suggestion that the prior art forms part of the common general knowledge.

SUMMARY

The present invention provides a method of determining the weight of a vehicle, the method comprising the steps of: a) determining with one or more on-board sensors, a sensor output voltage; b) providing the sensor output voltage to a processing unit to calculate the weight of the vehicle; and c) displaying the weight of the vehicle on a visual display unit. The present invention further provides a method of modifying a vehicle to be able to determine the vehicle's weight, the method comprising the steps of: a) providing a plurality of on-board sensors, wherein the sensors are connected to suspension components of the vehicle; b) providing a processing unit, wherein the processing unit is functionally connected to the on-board sensors and adapted to receive and analyse one or more sensor output voltage signals therefrom; and c) calculating the weight of the vehicle. The present invention yet further provides an in-vehicle weighing system comprising: one or more on-board sensors functionally connected to a processing unit; and a processing unit adapted to calculate a vehicle's weight.

Preferably, the sensors are connected to vehicle suspension components, whereby movement of said suspension components results in one or more of the sensors sending a sensor output voltage to a processing unit and said processing unit analysing the sensor output voltage to calculate a weight of the vehicle. Most preferably, the on-board sensors comprise potentiometers.

Preferably, the one or more on-board sensors are connected directly to relevant critical suspension components, optionally through one or more adjustable linkages or one or more extension springs, wherein the position of the suspension components is directly related to the load on the axle to which the relevant sensor is connected. More preferably, the connections vary the sensor output voltage relevant to the suspension component position. Most preferably, the one or more potentiometers respond to vehicle suspension movement to thereby alter the sensor output voltage from the potentiometers.

Preferably, the processing unit averages the received sensor output voltages over time period to eliminate fluctuations in sensor output voltages. Preferably, the processing unit recognises fluctuations in sensor output voltages over a time period and removes them before the vehicle weight information is displayed on a cabin display unit or sent to an off-vehicle site. Preferably, an electrical connection to the vehicle parkbrake mechanism is provided to interrupt the signal to the cabin display unit whilst the handbrake is engaged or disengaged, depending on the system employed. Preferably, the system further comprises one or more accelerometer, wherein the accelerometer is calibrated to interrupt the signal between the on-board sensor and the cabin display unit.

The present invention may also provide advantages over previously known vehicle weighing systems and methods and overcome drawbacks of such systems. For example, previous systems were limited in application to vehicles comprising solid or beam axle suspension design. The present invention is suitable for all suspension design types including, but not limited to: solid axle, beam axle, and independent suspension. Further, there is a need for only a single sensor per axle.

The present invention further provides a method of calibrating the system for determining a vehicle's weight, the method comprising the steps: weighing the vehicle, whereby separate measurements for front axle weight, rear axle weight and gross vehicle mass are obtained; recording sensor output voltages from each of the on-board sensors; adding a load to the vehicle and re-determining the sensor output voltages; and using an algorithm that extrapolates and interpolates the data to correlate sensor output voltages with a vehicle weight. Where the present invention displays the weight of the vehicle on a visual display unit, such weight information may be shown in a number of different formats including, but not limited to separate measurements for front axle weight, rear axle weight, gross vehicle mass (GVM), and remaining legal capacity.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein.

Figure 1:
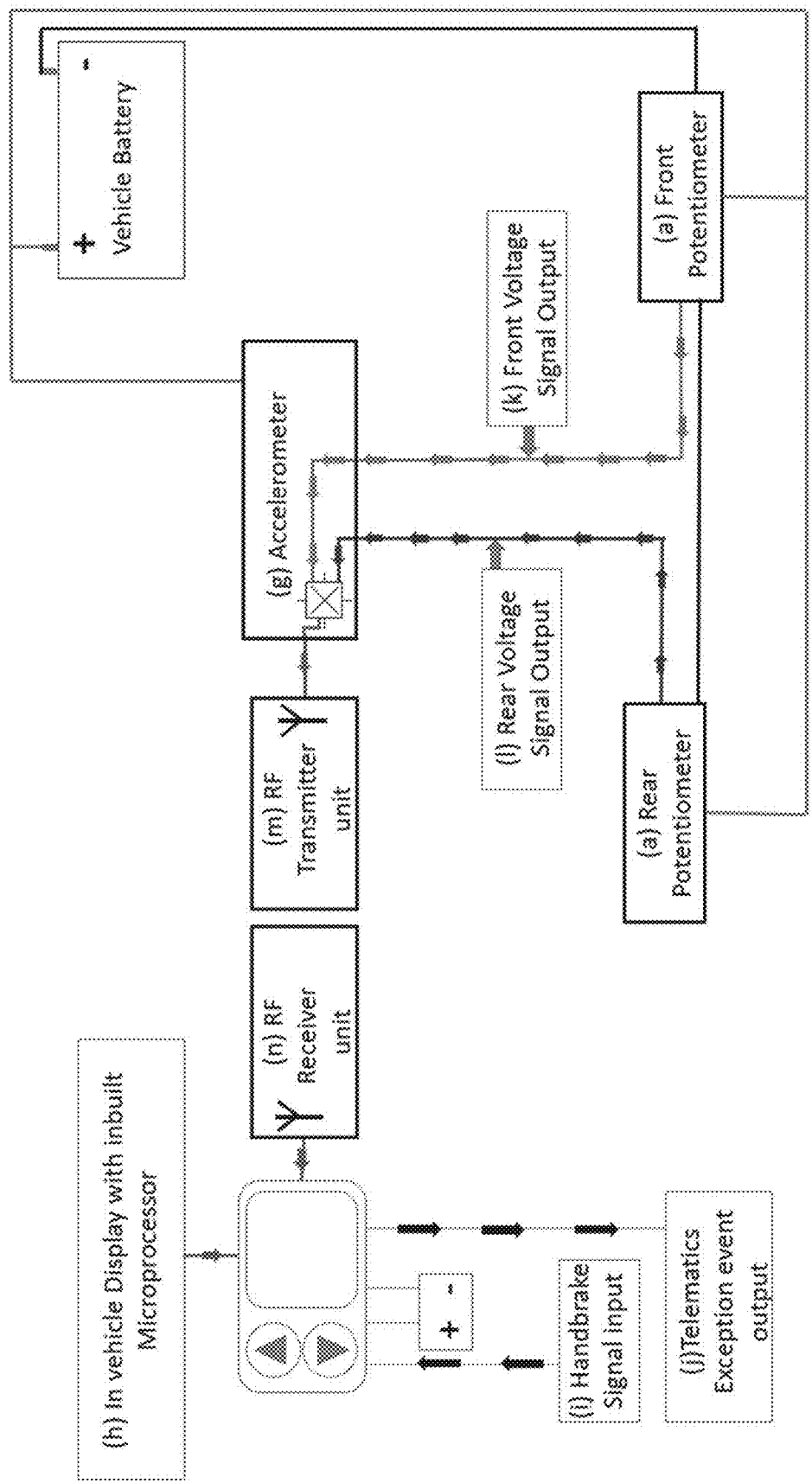
FIG. 1 shows a plan of the basic electrical components according to one embodiment of the present invention.

Skilled addressees will appreciate that elements in the drawings are illustrated for simplicity and clarity and have not necessarily been drawn to scale. For example, the relative dimensions of some elements in the drawings may be distorted to help improve understanding of embodiments of the present invention.

DETAILED DESCRIPTION

The present invention provides an in-vehicle weighing method and system, and an additional methodology to efficiently calibrate the method and system to all critical load specifications including tare (unladen) weight, axle capacities and GVM. The in-vehicle weighing system of the present invention comprises one or more on-board sensors functionally connected to a processing unit, wherein the processing unit may be adapted to send vehicle weight information to a cabin display unit for display thereon. See FIG. 1 for one embodiment of a system according to the invention. Preferably, the cabin display unit is adapted to show, in real-time, current vehicle weight information. In certain embodiments, the vehicle weight information may be transmitted to an off-vehicle site where the vehicle weight information may be monitored.

FIGS. 2 to 5 show exemplary modes of attachment of the sensors to the vehicle, in accordance with the present invention. On-board sensors may be connected directly to relevant critical suspension components through adjustable linkages, these connections act to vary the sensor output voltage relevant to the suspension component position. The position of these suspension components is directly related to the load on the axle to which the relevant sensor is connected (front or rear, as explained for each of front and rear below). The on-board sensors are preferably potentiometers. Most preferably, the potentiometers are rotary potentiometers. The use of potentiometers requires that two components move relative to each other when the vehicle undergoes a change in load. The potentiometers rely on suspension component movement to move the potentiometer and thereby alter the sensor output voltage.

It is the sensor output voltage that is used to determine vehicle weight information. Determining vehicle weight information may involve the numerical value of the sensor output voltage and/or changes in the sensor output voltage over time and/or any other aspect of the sensor output voltage. To clearly represent this variety of usable information, the present invention will be described in terms of sensor voltage output information. Further, some processing of the sensor voltage output may occur prior to it being transmitted to the processing unit. Accordingly, sensor output voltage information is transmitted to the processing unit for conversion into vehicle weight information.

The potentiometers are connected to suitable vehicle components via various means including adjustable length linkages and/or extension springs. In the case of the front suspension, connection may be made by attachment to the stabiliser bar which rotates through suspension travel caused by load variation. A U-shaped clamp may be used to attach the required connecting bracket. The connecting rod may then be attached to both the potentiometer and connecting bracket. The rear potentiometer may be mounted to a bracket which is attached to the vehicle between its chassis rails. A connecting rod may join the potentiometer by attaching to a connecting bracket secured by one of the differential centre mount bolts (on vehicles with rear wheel drive) or other suitable attachment point on vehicles that are of front wheel drive only configuration.

As used herein, the concept of "functional connectivity" of the on-board sensor to the processing unit refers to the transmission of the sensor output voltage information from the on-board sensor to the processing unit. The transmission of sensor output voltage information may be by a wireless connection. In preferred embodiments, transmission is by radio frequency (RF, wireless connection).

The processing unit may be located distal from the on-board sensor. In preferred embodiments, the on-board sensor is connected to, or preferably includes, a radio frequency transmitter unit which allows communication with the processing unit. In some embodiments, such communication may be by a Wi-Fi standard, Bluetooth, or any other suitable radio signal. In further embodiments, the on-board sensor may allow sending and receiving of radio signals, whereby two-way communication between the on-board sensor and the processing unit is effected.

In certain embodiments of the present invention, the on-board sensor and/or the processing unit and/or the cabin display unit may include an accelerometer. Alternatively, the accelerometer may be a separate, functionally connected, component of the in-vehicle weighing system. The accelerometer may be calibrated to interrupt the signal between the on-board sensor and the cabin display unit. Interruption of the signal may be necessary to prevent the display of misleading information on the cabin display unit. Such misleading information may occur when the vehicle experiences certain conditions, such as excessive pitch of the vehicle, forward or aft, or under heavy braking or acceleration.

In certain embodiments of the present invention, the cabin display unit may include a processing unit, preferably comprising a microprocessor, which is adapted to receive and process the sensor output voltage. On receiving a sensor output voltage, the processing unit converts it, using a mathematical algorithm, to determine vehicle weight information. Vehicle weight information may be selected from the group consisting of: front axle weight, rear axle weight, gross vehicle mass, and remaining legal capacity. Vehicle weight information may be displayed as a weight unit of measurement (metric or imperial relevant to market). This measurement is preferably displayed on the cabin display unit, thereby providing the vehicle operator with a real-time indication of current loads for front axle, rear axle and total GVM. These figures can be displayed as either actual load or remaining capacity, based on operator/fleet owner preference. Weights may be shown in increments of 1, 2, 5 or 10 kg.

In order for the in-vehicle weighing system of the present invention to provide accurate weight measurements, the system must be calibrated. Such calibration may involve, firstly weighing the vehicle, upon which the system is installed, such that separate measurements for front axle weight, rear axle weight and GVM can be obtained. Recording the sensor output voltages from each of the installed on-board sensors. Adding a load to the vehicle and re-determining the above measurements. Additional loads may also be added to the vehicle and further measurements taken. The various data may then be used to calculate vehicle axle weights for given sensor output voltages, using an algorithm that extrapolates and interpolates the data.

With the processing unit suitably programmed with the calibrating data and algorithm, the weights borne by each axle may be determined in real-time in a moving vehicle. In certain embodiments of the present invention, the processing unit may average the received sensor output voltages over a number of seconds in order to eliminate instantaneous fluctuations in sensor output voltages due to suspension movement in response to irregular road surfaces. Alternatively, the processing unit may be programmed to recognize such variations and remove them before the vehicle weight information is displayed on the cabin display unit or sent to the off-vehicle site.

Calibration of the system is important to the utility of the information displayed on the visual display unit. Accordingly, in certain embodiments of the present invention, the system may be adapted to present a reminder for calibration to be checked or redone at specific intervals of time. The intervals of time may be of any length, such as, but not limited to, 60 days, 6 months, 12 months etc. For example, a reminder may be displayed on the display unit, advising that the system is due to be calibrated 30 days prior to the expiry of the interval. Alternatively or additionally, the reminder for calibration may be activated in response to an exception event, temperature change or if any one of more of the fixed components of the weighing system or suspension is altered, moved, replaced, updated or otherwise disturbed.

In certain embodiments of the present invention, the system may be adapted to display an error message (such as "Calibration Required") and/or not display vehicle weight information if calibration is not performed within a pre-defined period after the reminder is displayed. In certain embodiments of the present invention, an electrical connection to the vehicle park brake/handbrake mechanism is provided to interrupt the signal to the visual display unit whilst the handbrake is engaged. In these embodiments, the vehicle weight is determined when the vehicle is in motion and the above described methods for averaging signals or removing fluctuations in sensor output voltages is needed since the moving vehicle will be prone to unstable output voltages due to the movement of the vehicle over rough surfaces, during cornering and acceleration/deceleration.

In certain embodiments of the present invention, an electrical connection to the vehicle park brake/handbrake mechanism is provided to interrupt the signal to the visual display unit whilst the handbrake is disengaged. In these embodiments, the vehicle weight is determined when the vehicle is stationary. Optionally, the disruption of signal to the visual display unit also occurs when the vehicle ignition is turned off and for a short period (up to 15, 30, 45 or 60 seconds) after the ignition is turned on, to prevent an overload event occurring when the visual display unit is first powered on. Further iterations of the invention may use this connection to provide the vehicle operator visual and audible warnings around the engagement of the handbrake when the vehicle is stationary. In such embodiments, the need for averaging signals or removing fluctuations in sensor output voltages is reduced since the stationary vehicle will be less prone to unstable output voltages due to the lack of movement of the vehicle.

In embodiments of the invention where an electrical connection to the vehicle parkbrake/handbrake mechanism is provided to interrupt the signal to the visual display unit whilst the handbrake is disengaged/engaged, the interruption is preferably only in relation to signal to the visual display, while the other components of the system remain powered and functional. In certain embodiments of the in-vehicle weighing system of the present invention, a font colour change on the cabin display unit may be used to provide visual impact when any vehicle weight measurement specification meets a pre-determined advisory point. In further embodiments, an optional, audible alarm function may be used to alert the vehicle operator of an overload event. In certain preferred embodiments, the vehicle operator must manually acknowledge the alarm to deactivate it.

In addition to providing the vehicle operator real-time information, the system may further provide for 'exception event' signals to be transmitted to a vehicle telematics system (VTS, where fitted). This signal identifies these events to fleet manager/owners, ensuring oversight and corporate compliance obligations are met. In certain other embodiments of the present invention, the transmission of these 'exception events' may be achieved via the incorporation of Bluetooth or other functionality such as the 4G/5G cellular networks. In yet further embodiments, an email or other message may be sent to fleet manager/owners to notify such of 'exception events' and overload events. Any exception events outlined above may be further stored in a read only memory (ROM) contained within the in-vehicle unit for further assessment by the vehicle operator/fleet controller.

The arrangement of the basic electrical components, of an embodiment of a system according to the present invention, is illustrated in FIG. 1. In line with the above description, the front and rear potentiometers (a) respond to vehicle suspension movement to thereby alter the voltage signal outputs from the potentiometers (k)(l) (also referred to herein as sensor output voltage information). Typically, the voltage signal outputs will be transmitted from the RF transmitter unit (m) to the RF receiver unit (n). The RF receiver unit (n) is connected to a processing unit (h) that processes the voltage signal output to determine a vehicle weight, axle weight or other information as required by an operator and programmed into the processing unit (h). The weight or other information is then displayed on a cabin display unit (h) and/or transmitted to an off-vehicle site. In the illustrated embodiment, the processing unit is physically located with the cabin display unit (h), however, it is within the scope of the invention that the processing unit and display unit are physically separated. The processing unit may also receive information about other aspects of vehicle function, such as handbrake/parkbrake condition (i), since these conditions may also be taken into account by the processing unit for the determination of vehicle weight etc. In the illustrated embodiment, an accelerometer (g) is incorporated between the potentiometers and the RF transmitter unit (m). As discussed above, the accelerometer may be used to detect conditions that may result in aberrant signals being produced by the potentiometers. If such conditions are detected, the system may be adapted to prevent voltage signal outputs being transmitted from the signal transmission component in order to prevent erroneous data being received by, processed by, and/or displayed on, the cabin display unit.

The embodiments described herein are provided by way of example only and are not to be taken as limiting the scope of the present invention.

Figure 2:
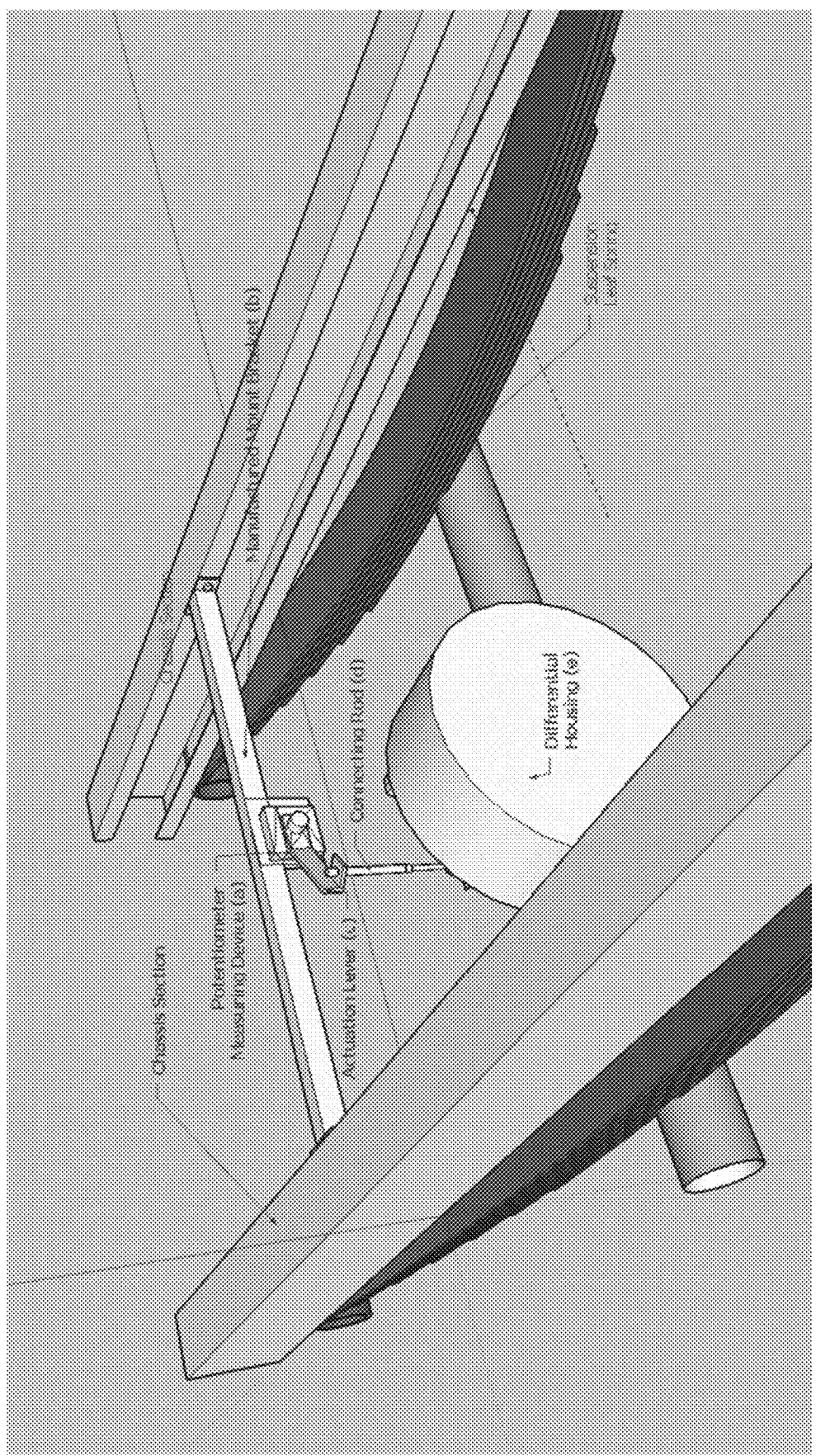
FIGS. 2 and 3 show a simplified view of installation, in a leaf spring suspension application, of a sensor according to one embodiment of the present invention.
Figure 3:
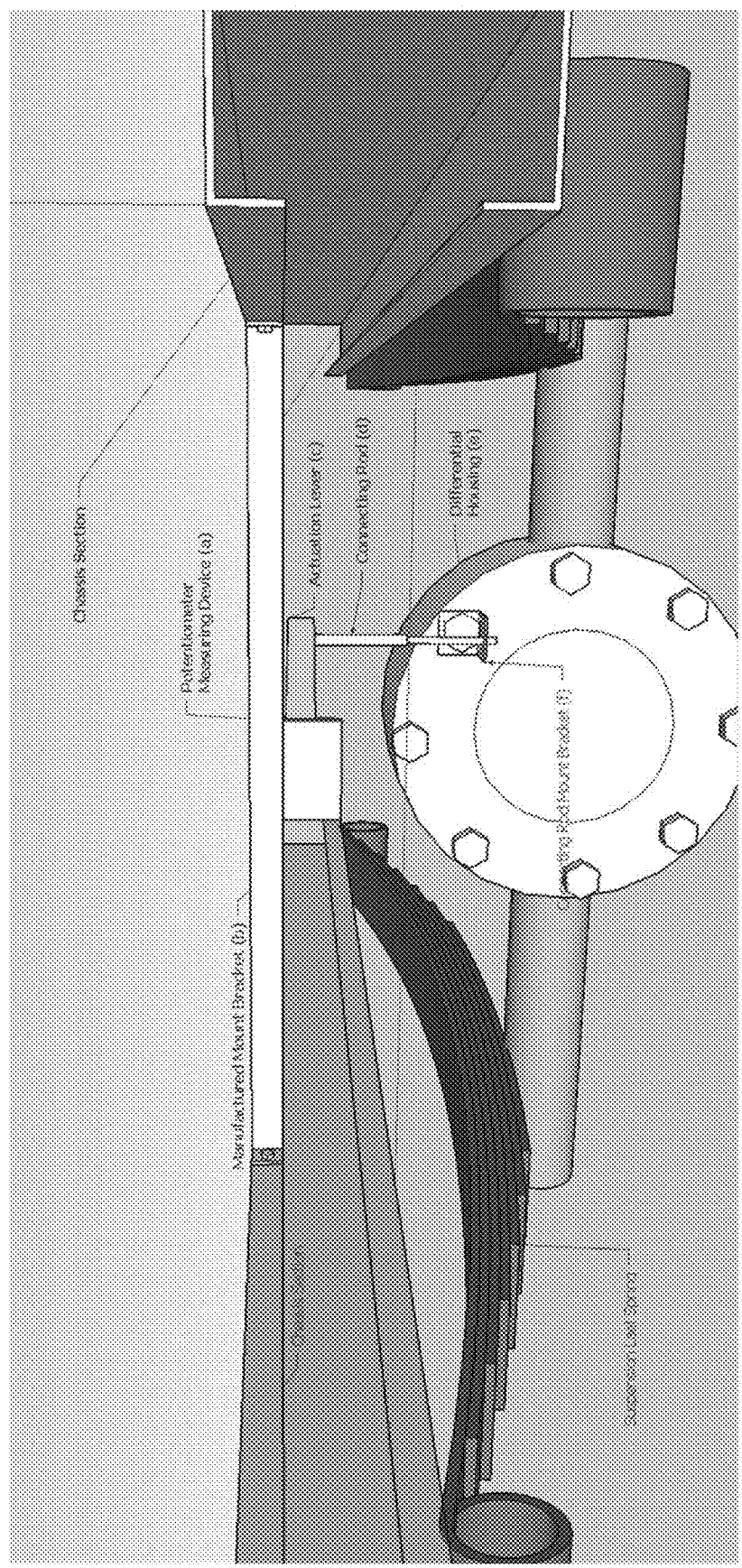

FIGS. 2 and 3 show a simplified view of installation, in a leaf spring suspension application, of a sensor according to one embodiment of the present invention. As illustrated in this exemplary application, the potentiometer is fixed to a vehicle component that does not move relative to the vehicle chassis. For example, a bar fixed between two chassis rails, located close to a differential housing or axle. At a first end, a connecting rod is connected to the differential housing, or axle. At a second end, the connecting rod is connected to an actuation lever which is in turn connected to the shaft of the potentiometer, whereby movement of the actuation lever results in rotation of the shaft, resulting in a change in potentiometer output voltage. As clearly shown in the FIGS. 2 and 3, the differential housing or axle is able to move relative to the chassis due to the presence of suspension leaf springs therebetween. Accordingly, when a load is placed on the vehicle, the chassis will move relative to the differential housing or axle, resulting in rotation of the shaft of the potentiometer.

Figure 4:
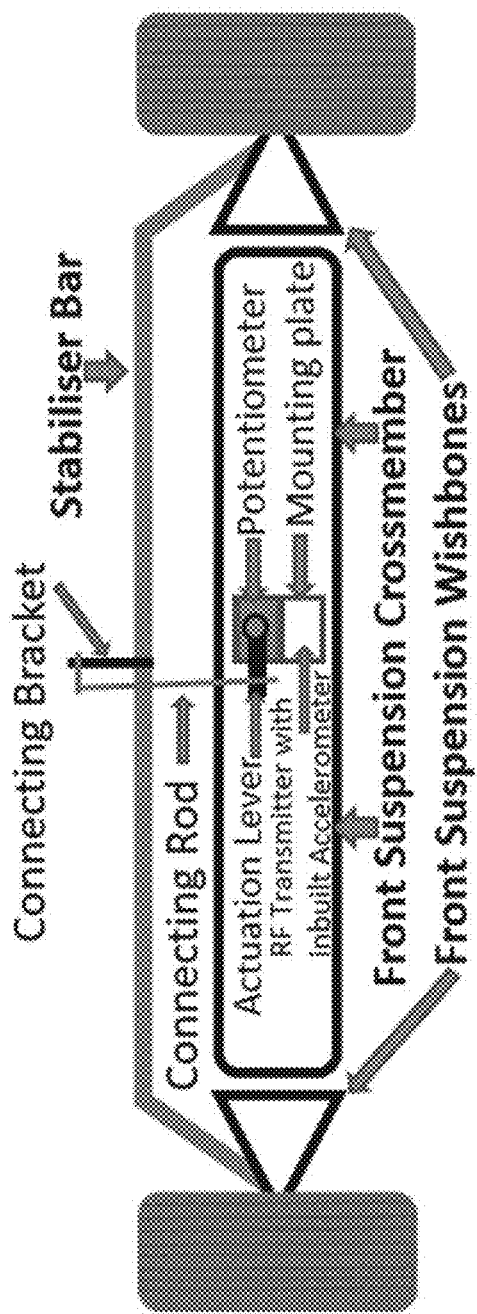
FIGS. 4 and 5 show a simplified view of installation, in a twin wishbone suspension application, of a sensor according to one embodiment of the present invention.
Figure 5:
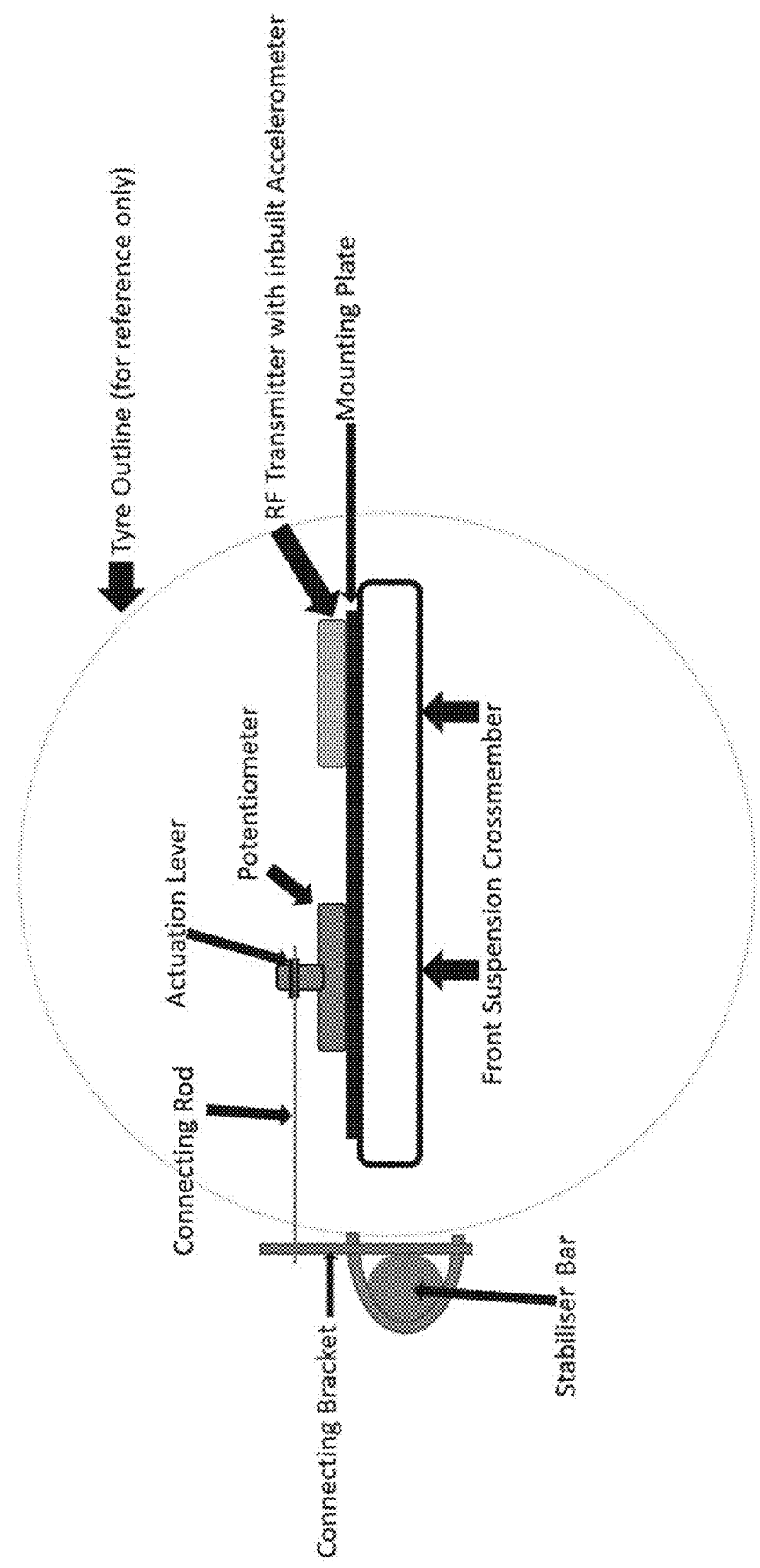

FIGS. 4 and 5 show a simplified view of installation, in a twin wishbone suspension application, of a sensor according to one embodiment of the present invention. As illustrated in this exemplary application, the potentiometer is mounted to a front suspension crossmember. As with the above example, a connecting rod and actuation lever are used to rotate the shaft of the potentiometer. In this application, the first end of the connecting rod is engaged with a connecting bracket that is in turn attached to a stabiliser bar of the suspension. When the suspension is loaded, the stabiliser bar is caused to flex, resulting in rotation of a portion of the stabiliser bar. Such rotation is translated into movement of the connecting bracket, thereby causing movement of the connecting rod and actuation lever. Accordingly, when a load is placed on the vehicle, the stabiliser bar will rotate relative to the front suspension crossmember, resulting in rotation of the shaft of the potentiometer.

In preferred embodiments, an RF transmitter unit is located close to each potentiometer to facilitate transmission of sensor output voltage information to the RF receiving unit. In certain embodiments, the potentiometer and RF transmitter unit may be mounted upon the same vehicle component, or are present in a single module to further simplify installation of the on-board vehicle scale of the present invention.

The system of the present invention provides a number of advantages over previously available systems. For example, no other currently available system is purposely designed for light commercial vehicles (under 4.5 tonnes GVM). The use of an accelerometer to limit false readings through weight transfer with vehicle pitch is not previously available. Further, connection to the handbrake mechanism has not been available previously.

In certain preferred embodiments, the use of potentiometers as voltage dividers, incorporating an RF transmitter and an accelerometer provides and accurate and unique weight measurement not previously available for vehicles with a double wishbone/leaf spring configuration.

Figure 6:
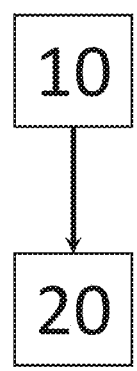
FIG. 6 schematically illustrates the transfer and processing of information according to one embodiment of the present invention.

FIG. 6 is a flow chart illustrating the steps of a method according to the present invention. Preferably, each on-vehicle sensor sends a voltage signal output 10 to the processing unit, wherein the processing unit uses the voltage signal output 10 to determine vehicle weight information 20.

Figure 7A:
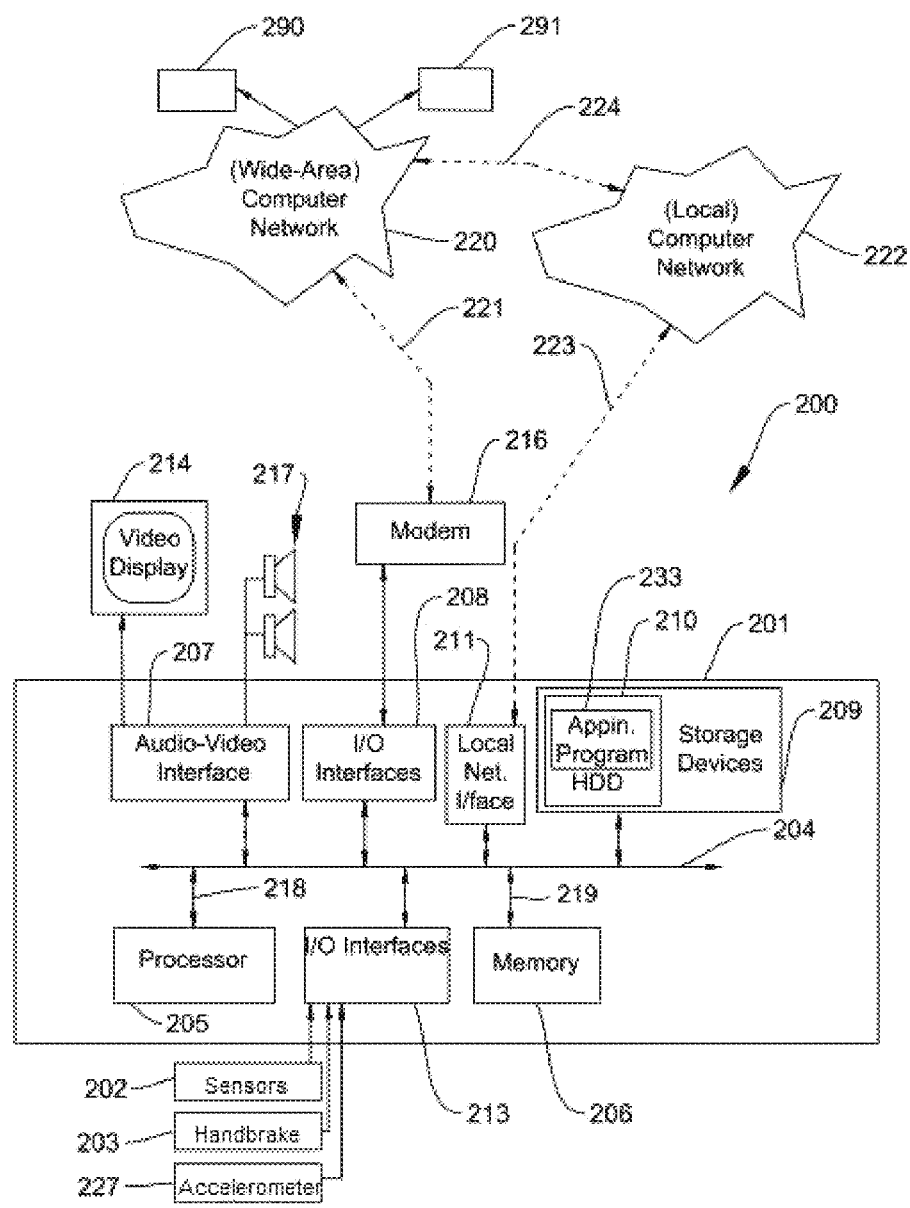
FIG. 7 shows a schematic diagram of the arrangement of an embodiment of an in-vehicle weighing system of the present invention (7A) and a schematic diagram illustrating the functional operations of an embodiment of a system according to the present invention (7B).
Figure 7B:
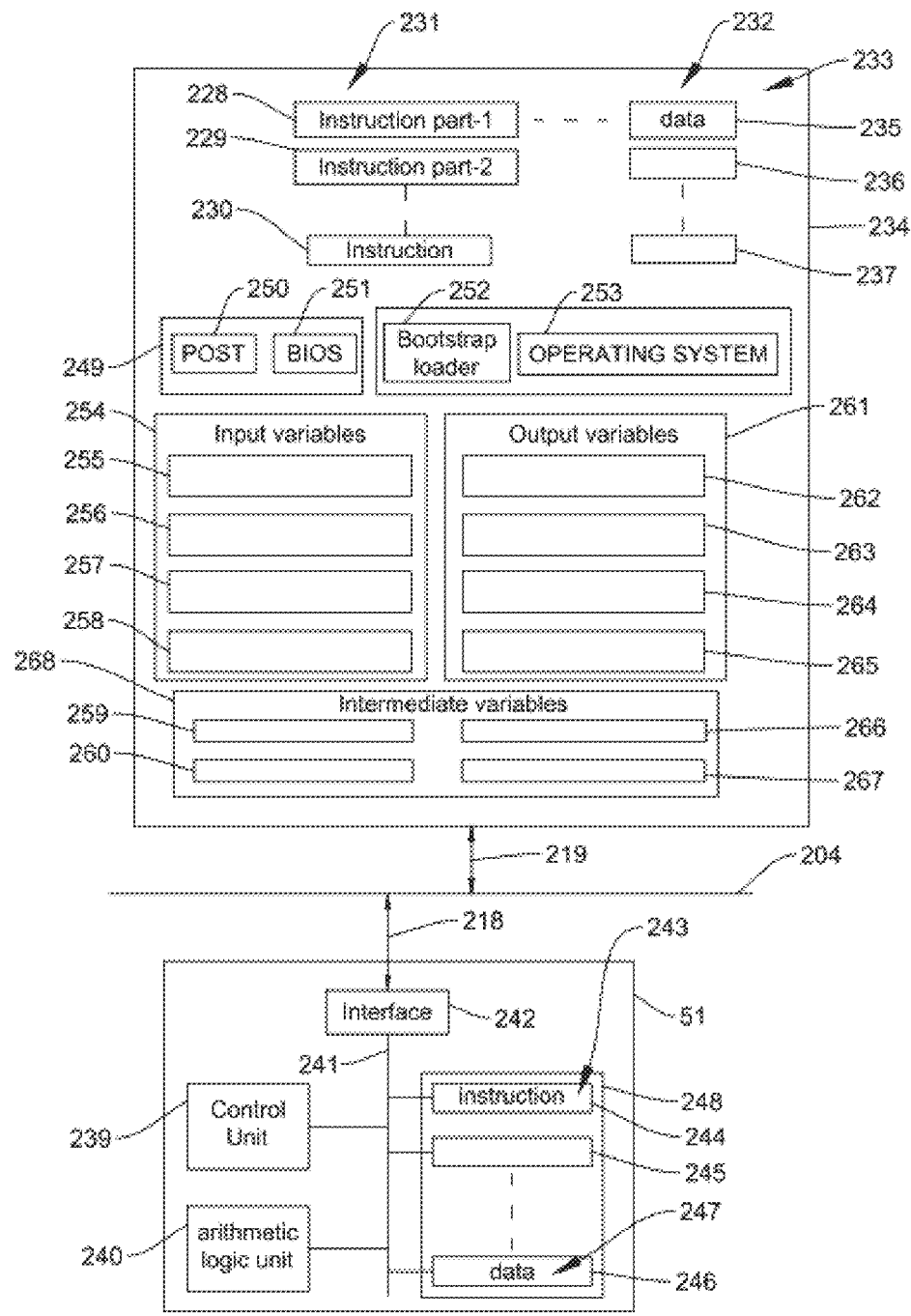

One embodiment of an in-vehicle weighing system 200 suitable for use in the present invention is shown in FIGS. 7A and 7B. In the embodiment shown, the in-vehicle weighing system 200 comprises a processing unit 201; input devices such as voltage output signals from on-vehicle sensors 202, a handbrake signal 203, an accelerometer 227; and output devices including a cabin display unit 214 and loudspeakers 217. In some embodiments the cabin display unit 214 may comprise a touchscreen.

A Modulator-Demodulator (Modem) transceiver device 216 may be used by the processing unit 201 for communicating to and from a communications network 220 via a connection 221. The network 220 may be a wide-area network (WAN), such as the Internet, a cellular telecommunications network, or a private WAN. Through the network 220, the processing unit 201 may be connected to other similar personal devices 290 or server computers 291. Preferably, the connection 221 is a wireless connect and a wireless modem is used for wireless connection to network 220.

The processing unit 201 typically includes at least one processor 205, and a memory 206 for example formed from semiconductor random access memory (RAM) and semiconductor read only memory (ROM). The processing unit 201 also includes a number of input/output (I/O) interfaces including: an audio-video interface 207 that couples to the video display 214 and loudspeakers 217; an I/O interface 213 for the sensors 202, handbrake 203 and accelerometer 227; and an interface 208 for the external modem 216. In some implementations, modem 216 may be incorporated within the processing unit 201, for example within the interface 208. The processing unit 201 also has a local network interface 211 which, via a connection 223, permits coupling of the in-vehicle weighing system 200 to a local computer network 222, known as a Local Area Network (LAN).

As also illustrated, the local network 222 may also couple to the wide network 220 via a connection 224, which would typically include a so-called "firewall" device or device of similar functionality. The interface 211 may be formed by an Ethernet circuit card, a Bluetooth wireless arrangement or an IEEE 802.11 wireless arrangement or other suitable interface. The I/O interfaces 208 and 213 may afford either or both of serial and parallel connectivity, the former typically being implemented according to the Universal Serial Bus (USB) standards and having corresponding USB connectors (not illustrated).

Storage devices 209 are provided and typically include a hard disc drive (HDD) 210. Other storage devices such as, an external hard disc (HD) 227, a disc drive (not shown) and a magnetic tape drive (not shown) may also be used.

The components 205 to 213 of the computer module 201 typically communicate via an interconnected bus 204 in a manner that results in a conventional mode of operation of the in-vehicle weighing system 200. In the embodiment shown in FIGS. 7A and 7B, processor 205 is coupled to system bus 204 through connections 218. Similarly, memory 206 is coupled to the system bus 204 by connection 219.

FIG. 7B is a detailed schematic block diagram of processor 205 and a memory 234. The memory 234 represents a logical aggregation of all the memory modules, including the storage device 209 and semiconductor memory 206, which can be accessed by the processing unit 201 in FIG. 7A.

The methods of the invention may be implemented as one or more software application programs 233 executable within the processing unit 201. In particular, the steps of the methods of the invention may be effected by instructions 231 in the software carried out within the processing unit 201

The software instructions 231 may be formed as one or more code modules, each for performing one or more particular tasks. The software 233 may also be divided into two separate parts, in which a first part and the corresponding code modules performs the method of the invention and a second part and the corresponding code modules manage a graphical user interface between the first part and the user.

The software 233 may be stored in a computer readable medium, including in a storage device of a type described herein. The software is loaded into the personal device 200 from the computer readable medium or through network 221 or 223, and then executed by the processing unit 201. In one example the software 233 is stored on storage medium 225. Software 233 is typically stored in the HDD 210 or the memory 206.

In some instances, the software application programs 233 may be supplied to the user encoded on one or more disk storage medium such as a CD-ROM, DVD or Blu-Ray disc, or alternatively may be read by the user from the networks 220 or 222. Still further, the software can also be loaded into the in-vehicle weighing system 200 from other computer readable media. Computer readable storage media refers to any non-transitory tangible storage medium that provides recorded instructions and/or data to the processing unit 201 or in-vehicle weighing system 200 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the processing unit 201. Examples of transitory or non-tangible computer readable transmission media that may also participate in the provision of software application programs 233, instructions 231 and/or data to the processing unit 201 include radio or infra-red transmission channels as well as a network connection 221, 223, 334, to another computer or networked device 290, 291 and the Internet or an Intranet including email transmissions and information recorded on Websites and the like.

The second part of the application programs 233 and the corresponding code modules mentioned above may be executed to implement one or more graphical indications to be rendered or otherwise represented upon display 214. Through input signals received from sensors 202, handbrake 203 and accelerometers 226, the in-vehicle weighing system 200 and the methods of the invention may manipulate the interface in a functionally adaptable manner to provide controlling commands and/or input to the applications associated with the graphical indications.

When the processing unit 201 is initially powered up, a power-on self-test (POST) program 250 may execute. The POST program 250 is typically stored in a ROM 249 of the semiconductor memory 206. A hardware device such as the ROM 249 is sometimes referred to as firmware. The POST program 250 examines hardware within the processing unit 201 to ensure proper functioning, and typically checks processor 205, memory 234 (209, 206), and a basic input-output systems software (BIOS) module 251, also typically stored in ROM 249, for correct operation. Once the POST program 250 has run successfully, BIOS 251 activates the operating system 253. Operating system 253 is a system level application, executable by processor 205, to fulfill various high level functions, including processor management, memory management, device management, storage management, software application interface, and generic user interface.

Operating system 253 manages memory 234 (209, 206) in order to ensure that each process or application running on computer module 201 has sufficient memory in which to execute without colliding with memory allocated to another process. Furthermore, the different types of memory available in the personal device 200 must be used properly so that each process can run effectively. Accordingly, the aggregated memory 234 is not intended to illustrate how particular segments of memory are allocated, but rather to provide a general view of the memory accessible by computer module 201 and how such is used.

Processor 205 includes a number of functional modules including a control unit 239, an arithmetic logic unit (ALU) 240, and a local or internal memory 248, sometimes called a cache memory. The cache memory 248 typically includes a number of storage registers 244, 245, 246 in a register section storing data 247. One or more internal busses 241 functionally interconnect these functional modules. The processor 205 typically also has one or more interfaces 242 for communicating with external devices via the system bus 204, using a connection 218. The memory 234 is connected to the bus 204 by connection 219.

Application program 233 includes a sequence of instructions 231 that may include conditional branch and loop instructions. Program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, processor 205 is given a set of instructions 243 which are executed therein. The processor 205 then waits for a subsequent input, to which processor 205 reacts by executing another set of instructions. Each input may be provided from one or more of a number of sources, including data generated by one or more of the input devices 202, 203, or 226, or data received from an external source across one of the networks 220, 222. The execution of a set of the instructions may in some cases result in output of data. Execution may also involve storing data or variables to the memory 234.

The disclosed arrangements use input variables 254 that are stored in the memory 234 in corresponding memory locations 255, 256, 257, 258. The described arrangements produce output variables 261 that are stored in the memory 234 in corresponding memory locations 262, 263, 264, 265. Intermediate variables 268 may be stored in memory locations 259, 260, 266 and 267.

The register section 244, 245, 246, the arithmetic logic unit (ALU) 240, and the control unit 239 of the processor 205 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from memory location 228, 229, 230;

(b) a decode operation in which control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the methods of the invention may be associated with one or more segments of the program 233, and may be performed by register section 244-246, the ALU 240, and the control unit 239 in the processor 205 working together to perform the fetch, decode, and execute cycles for every instruction in the instruction set for the noted segments of program 233. One or more other computers 290 may be connected to the communications network 220 as seen in FIG. 7A. Each such computer 290 may have a similar configuration to the processing unit 201 and corresponding peripherals.

One or more other server computer 291 may be connected to the communications network 220. These server computers 291 respond to requests from the personal device or other server computers to provide information.

The methods of the present invention may alternatively be implemented in dedicated hardware such as one or more integrated circuits performing the functions or sub functions of the described methods. Such dedicated hardware may include graphic processors, digital signal processors, or one or more microprocessors and associated memories.

It will be understood that in order to practice the methods of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it will be understood that each of the processor and/or the memory may be composed of different physical pieces of equipment. Accordingly, it is not necessary that a processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. It will be understood, however, that the processing performed by two distinct components as described above may, in accordance with a further embodiment of the invention be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, a telecommunications network (e.g., a cellular or wireless network) or any client server system that provides communication, for example. Such communications technologies may use any suitable protocol such as TCP/IP, UDP, or OSI, for example.

EXAMPLE

In an exemplary embodiment of the present invention, there is provided a vehicle comprising a plurality of electrically-connected on-board rotary potentiometers attached to suspension components of the vehicle, whereby movement of the suspension components results in rotation of the potentiometer shaft and a concomitant change in output voltage from the potentiometer. Accordingly, the on-board potentiometers are on-board sensors for the purpose of the present invention. The output voltage is transmitted via Bluetooth to an on-board processing unit in the form of sensor output voltage information. The on-board processing unit uses the sensor output voltage information to determine the weight of the vehicle. The processing unit then causes the vehicle weight information to be displayed on a screen within the vehicle. In order to determine the weight of the vehicle, the processing unit must be calibrated. Calibration is a multi-step process. Initially, sensor output voltage is determined for an unladened vehicle. Then incremental weights are added to the vehicle and sensor output voltages are determined for each weight, up to the specified capacity for the vehicle. An algorithm is then used to extrapolate and interpolate the data to correlate sensor output voltages with a vehicle weight. Similar calibration may also be performed on each axle individually.

Due to the critical importance of calibration to the safe operation of the on-board scale of the present invention, regular re-calibrated of the system is highly desirable. Accordingly, the system includes alerts that remind the vehicle operator that re-calibration is due. If the system is not re-calibrated within a specified period after the reminder is displayed, the system will cause the vehicle weight information to fail to appear on the screen, until such time as the system has been re-calibrated.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art. Further, any prior art reference or statement provided in the specification is not to be taken as an admission that such art constitutes, or is to be understood as constituting, part of the common general knowledge. Where the terms "comprise", "comprises", "comprised" or "comprising" or the terms "include", "includes", "included" or "including" are used in this specification, they are to be interpreted as specifying the presence of the stated features, integers, steps or components referred to, but not to preclude the presence or addition of one or more other feature, integer, step, component or group thereof.

The invention claimed is:

1. A method of determining a weight of a vehicle, the method comprising the steps of:
   a) determining with one or more on-board sensors, a sensor output voltage, wherein the one or more on-board sensors are connected directly to vehicle suspension components and wherein a position of the suspension components is directly related to a load on an axle to which a relevant sensor is connected and wherein the one or more on-board sensors are connected to a vehicle stabilizer bar;
   b) providing sensor output voltage information corresponding to the sensor output voltage to a processing unit, movement of a stabilizer bar results in one or more of the on-board sensors transmitting sensor output voltage information to the processing unit and the processing unit analysing the sensor output voltage information to determine the weight of the vehicle by converting the sensor output voltage information received form one or more sensor using a mathematical algorithm; and
   c) displaying the weight of the vehicle on a visual display unit.

2. The method according to claim 1, wherein the one or more on-board sensors comprise rotary potentiometers that respond to vehicle suspension movement to thereby alter the sensor output voltage, and thereby the sensor output voltage information, from the potentiometers.

3. The method according to claim 1, wherein the processing unit recognises fluctuations in sensor output voltages over a time period and removes them before the weight of the vehicle is displayed on the visual display unit or sent to an off-vehicle site.

4. The method according to claim 1, wherein one or more visual indicia is provided when a vehicle weight measurement specification meets a pre-determined advisory point, optionally wherein a vehicle operator must manually deactivate the visual indicia.

5. The method according to claim 1, wherein the visual display unit displays weight of the vehicle selected from the group consisting of: front axle weight, rear axle weight, gross vehicle mass, and remaining legal capacity.

6. The method according to claim 1, wherein an internal clock is programmed to reset at time of calibration and provide a vehicle operator with a reminder of when a future calibration is due, prior to a calibration due date or overdue.

7. The method according to claim 1, wherein the one or more on-board sensors are connected directly to vehicle suspension components, through one or more adjustable linkages or one or more extension springs.

8. The method according to claim 1, wherein the processing unit averages the sensor output voltage information over time to eliminate fluctuations in sensor output voltages.

9. The method according to claim 1, wherein an exception event is transmitted to a vehicle telematics system (VTS).

10. An in-vehicle weighing system comprising:
    a processing unit adapted to determine a weight of a vehicle;
    one or more on-board sensors functionally connected to the processing unit wherein the one or more on-board sensors are connected directly to vehicle suspension components and wherein a position of the suspension components is directly related to a load on an axle to which a relevant sensor is connected and wherein one or more of the on-board sensors are connected to a vehicle stabilizer bar, movement of the stabilizer bar results in one or more of the on-board sensors transmitting sensor output voltage information to the processing unit; and
    a visual display unit to display the weight of the vehicle thereon,
    wherein the one or more on-board sensors provide sensor output voltage information to the processing unit to determine the weight of the vehicle by converting the sensor output voltage information received from one or more sensor using a mathematical algorithm.

11. A method of calibrating the in-vehicle weighing system for determining the weight of the vehicle of claim 10, wherein the calibrating comprises:
    weighing the vehicle, whereby separate measurements for front axle weight, rear axle weight and gross vehicle mass are obtained;
    recording sensor output voltages from each of the on-board sensors;
    adding a load to the vehicle and re-determining the sensor output voltages; and
    using an algorithm that extrapolates and interpolates the data to correlate sensor output voltages with the weight of the vehicle.

12. The system according to claim 10, wherein the on-board sensors comprise rotary potentiometers that respond to vehicle suspension movement to alter the sensor output voltage, and the sensor output voltage information, from the potentiometers.

13. The system according to claim 10, wherein the processing unit recognises fluctuations in sensor output voltages over a time period and removes them before the weight of the vehicle is displayed on the visual display unit or sent to an off-vehicle site.

14. The system according to claim 10, wherein one or more visual indicia is provided when vehicle weight measurement specification meets a pre-determined advisory point.

15. The system according to claim 10, wherein the visual display unit displays weight of the vehicle selected from the group consisting of: front axle weight, rear axle weight, gross vehicle mass, and remaining legal capacity.

16. The system according to claim 10, wherein the one or more on-board sensors are connected directly to vehicle suspension components through one or more adjustable linkages or one or more extension springs.

17. The system according to claim 10, further comprising one or more accelerometer, wherein the accelerometer is calibrated to interrupt a signal between the on-board sensor and a cabin display unit.

18. The system according to claim 10 wherein the processing unit averages the received sensor output voltage information over a time to eliminate fluctuations in sensor output voltages.

19. The system according to claim 10, wherein the system comprises an internal clock programmed to reset at time of calibration and provide a vehicle operator with a reminder of when a future calibration is due, prior to a calibration due date or overdue.

20. A method of modifying a vehicle to be able to determine a weight of the vehicle, the method comprising the steps of:
    a) mounting a plurality of on-board sensors on suspension components of the vehicle, wherein the on-board sensors are adapted to transmit sensor output voltage information, the one or more on-board sensors are connected directly to vehicle suspension components, and wherein a position of the suspension components is directly related to a load on an axle to which a relevant sensor is connected and wherein one or more of the on-board sensors are connected to a vehicle stabilizer bar; and b) providing a processing unit in the vehicle, wherein the processing unit is functionally connected to the on-board sensors and adapted to receive and analyse sensor output voltage information therefrom whereby movement of the stabilizer bar results in one or more of the on-board sensors transmitting sensor output voltage information to the processing unit and said processing unit analysing the sensor output voltage information and determine the weight of the vehicle by converting the sensor output voltage information received from one or more sensor using a mathematical algorithm.

* * * * *